(12) United States Patent
Barnes et al.

(10) Patent No.: US 10,449,933 B2
(45) Date of Patent: Oct. 22, 2019

(54) FLUID SYSTEM AND METHOD

(71) Applicants: Andrew Phillip Barnes, Norfolk (GB);
Peter Stuart Brett, Berkshire (GB);
Steven Paul Goodier, Berkshire (GB);
Timothy Hugh Lake, Berkshire (GB);
Mark O'Malley, Norfolk (GB); Oliver Paul Taylor, Berkshire (GB); David John Roach Williams, Berkshire (GB)

(72) Inventors: Andrew Phillip Barnes, Norfolk (GB);
Peter Stuart Brett, Berkshire (GB);
Steven Paul Goodier, Berkshire (GB);
Timothy Hugh Lake, Berkshire (GB);
Mark O'Malley, Norfolk (GB); Oliver Paul Taylor, Berkshire (GB); David John Roach Williams, Berkshire (GB)

(73) Assignee: Castrol Limited, Reading (GB)

( * ) Notice: Subject to any disclaimer, the term of this patent is extended or adjusted under 35 U.S.C. 154(b) by 0 days.

(21) Appl. No.: 15/312,920

(22) PCT Filed: May 21, 2014

(86) PCT No.: PCT/GB2014/051567
§ 371 (c)(1),
(2) Date: Nov. 21, 2016

(87) PCT Pub. No.: WO2015/177489
PCT Pub. Date: Nov. 26, 2015

(65) Prior Publication Data
US 2017/0197596 A1    Jul. 13, 2017

(51) Int. Cl.
*G06F 7/00* (2006.01)
*B60S 5/00* (2006.01)
(Continued)

(52) U.S. Cl.
CPC ............ *B60S 5/00* (2013.01); *B60R 16/0231* (2013.01); *B60R 16/08* (2013.01); *B60S 1/48* (2013.01);
(Continued)

(58) Field of Classification Search
CPC .......... B60S 5/00; B60S 1/48; B60R 16/0231; B60R 16/08
See application file for complete search history.

(56) References Cited

U.S. PATENT DOCUMENTS 3,771,287 A   11/1973  Sunderland
4,151,823 A   5/1979   Grosse et al.
(Continued)

FOREIGN PATENT DOCUMENTS

CN        1836095       9/2006
CN        100538026     9/2009
(Continued)

*Primary Examiner* — Adam M Alharbi
(74) *Attorney, Agent, or Firm* — McDonnell Boehnen Hulbert & Berghoff LLP (57) ABSTRACT

A method is described of controlling at least one operation in at least part of a lifecycle of a replaceable container which is arranged to be removably seated in a dock in a vehicle and which at least before seating in the dock contains an ancillary fluid for use by the vehicle. A controller communicates with a data carrier carried by the container, determines, on the basis of the communication with the data carrier, data associated with at least one of the container, its contents and the vehicle, and controls carrying out of at least one action in relation to at least one of the container and its contents on the basis of the data associated with at least one of the container, its contents and the vehicle.

22 Claims, 4 Drawing Sheets

(51) Int. Cl.
  *B60R 16/023* (2006.01)
  *B60R 16/08* (2006.01)
  *B60S 1/48* (2006.01)
  *F01M 11/10* (2006.01)
  *F01P 11/14* (2006.01)
  *F02M 25/00* (2006.01)
  *F01M 11/00* (2006.01)

(52) U.S. Cl.
  CPC .............. *F01M 11/10* (2013.01); *F01P 11/14* (2013.01); *F02M 25/00* (2013.01); *F01M 2011/0095* (2013.01); *F01M 2011/14* (2013.01)

(56) References Cited

U.S. PATENT DOCUMENTS

| | | | |
|---|---|---|---|
| 5,454,354 | A | 10/1995 | Miller |
| 5,554,278 | A | 9/1996 | Henderson |
| 6,539,912 | B1 | 4/2003 | Beer |
| 8,500,869 | B1 | 8/2013 | Johnson et al. |
| 9,858,462 | B2 * | 1/2018 | McQuade ........... G06K 7/10861 |
| 9,869,219 | B2 | 1/2018 | Barnes et al. |
| 9,878,822 | B2 | 1/2018 | Barnes et al. |
| 9,890,901 | B2 | 2/2018 | Brett et al. |
| 2007/0039475 | A1 | 2/2007 | Unfried et al. |
| 2008/0179139 | A1 | 7/2008 | Montgomery |
| 2011/0068954 | A1 * | 3/2011 | McQuade ................ G08G 1/20 340/988 |
| 2011/0253092 | A1 | 10/2011 | Springer et al. |
| 2015/0291317 | A1 | 10/2015 | Brett et al. |
| 2015/0292372 | A1 | 10/2015 | Barnes et al. |
| 2017/0089234 | A1 | 3/2017 | Dawson et al. |
| 2017/0089235 | A1 | 3/2017 | Dawson et al. |
| 2017/0089236 | A1 | 3/2017 | Andersen et al. |
| 2017/0101911 | A1 | 4/2017 | Barnes |
| 2017/0107873 | A1 | 4/2017 | Ali et al. |
| 2017/0122151 | A1 | 5/2017 | Brett et al. |
| 2017/0183992 | A1 | 6/2017 | Barnes et al. |
| 2017/0190466 | A1 | 7/2017 | Andersen et al. |
| 2017/0351890 | A1 * | 12/2017 | McQuade .......... G06K 19/0723 |

FOREIGN PATENT DOCUMENTS

| | | |
|---|---|---|
| DE | 102012024365 | 6/2014 |
| JP | 2001-271085 | 10/2001 |
| JP | 2005-036677 | 2/2005 |
| JP | 2008-121468 | 5/2008 |
| JP | 2013064401 | 4/2013 |
| JP | 2014-100646 | 6/2014 |
| WO | 01/53663 | 7/2001 |
| WO | WO 2016/158971 | 10/2016 |

* cited by examiner

FLUID SYSTEM AND METHOD

CROSS REFERENCE TO RELATED APPLICATION

This application is a National Phase application of, and claims the benefit of, International (PCT) Application No. PCT/GB2014/051567, filed on May 21, 2014, the entire contents of which is incorporated herein by reference.

This invention relates to a method for use with fluid container, particularly a fluid container for supplying fluid to a fluid circulation system of a vehicle engine.

Many vehicle engines use one or more fluids for their operation. Such fluids are often liquids. For example, internal combustion engines use liquid lubricating oil compositions. Also, electric engines use heat exchange liquids for example to cool the engine, to heat the engine or to cool and heat the engine during different operating conditions. Such fluids are generally held in reservoirs associated with the engine.

Embodiments provide a method of controlling at least one operation in at least part of a lifecycle of a replaceable container which is arranged to be removably seated in a dock in a vehicle during operation of the vehicle and which at least before seating in the dock contains an ancillary fluid for use by the vehicle, which method comprises a controller: communicating with a data carrier carried by the container; determining, on the basis of the communication with the data carrier, data associated with at least one of the container, its contents and the vehicle; and controlling carrying out of at least one action in relation to at least one of the container and its contents on the basis of the data associated with at least one of the container, its contents and the vehicle.

Embodiments allow the actions carried out to be appropriate to the specific container and/or its contents or the vehicle with which it is associated so enabling, for example, stages and processes occurring in a lifecycle of the fluid container to be at least partially controlled or informed by the data associated with at least one of the container, its contents and the vehicle and determined on the basis of the communication with the data carrier.

The method may comprise determining whether the container is in fluidic communication with a fluid circulation system of the vehicle and controlling carrying out of at least one action in relation to at least one of the container and its contents in dependence upon whether the container is in fluidic communication with the fluid circulation system of the vehicle. The controlling of carrying out of at least one action in relation to at least one of the container and its contents may be carried out when the container is not in fluidic communication with the fluid circulation system of the vehicle. Additionally or alternatively, the controlling of carrying out of at least one action in relation to at least one of the container and its contents may be carried out when the container is in fluidic communication with the fluid circulation system of the vehicle.

The ancillary fluid may be selected from the group consisting of a lubricant, a hydraulic fluid, a pneumatic fluid, a washer fluid, a fuel additive.

The at least one action may comprise an action in relation to the contents of the container. For example, the at least one action may be selected from the group consisting of: disposing of the contents of the container; recycling of the contents of the container; adding the contents of the container to a recycling container arranged to store contents from a plurality of replaceable containers; replenishing the contents of the container; adding an additive to the contents of the container; reusing the contents of the container.

Additionally or alternatively, the least one action may comprise an action in relation to the container. For example, the at least one action may be selected from the group consisting of: inserting the container into a dock or through a gateway; removing the container from a dock or through a gateway; entry of the container into a facility; removal of the container from a facility; disposing of the container; recycling of the container; supplying of the container. In an example, the at least one action comprises at least one of inserting the container into a dock or through a gateway and removing the container from a dock or through a gateway. The dock or gateway may be selected from the group consisting of: a dock in a vehicle; a dock or a gateway in a transportation device; a dock or a gateway in a vehicle service centre; a dock or a gateway in an analysing facility; a dock or a gateway in a recycling facility.

The at least one action may comprise at least one action in relation to vehicle servicing.

The method may comprise analysing the contents of the container and controlling carrying out of the at least one action on the basis of the data associated with at least one of the container and on the basis of data obtained by analysing the contents of the container.

Controlling carrying out of at least one action may comprise permitting, inhibiting or preventing the at least one action.

The data carried by the data carrier may allow the controller to identify at least one of the container and its contents.

In an embodiment, the logistics of supply of fluid containers may be assisted and informed by the data carried by the data carrier which may enable the efficient supply of the correct fluid container to the right end user or supplier such as a garage specializing in a particular vehicle make or makes or a supplier specializing in the supply of specific fluids.

In an embodiment, the data associated with at least one of the container, its contents and the vehicle may assist in recycling of the fluid container and/or any remaining contents and may assist a controller and/or an operator in making a decision whether or not to recycle or dispose of at least one of the contents and the fluid container, where the fluid content is to be recycled and/or the manner in which it is to be recycled, for example to control whether or not the fluid is added to a recycled fluid store, so assisting in assuring that fluids of different types or different characteristics are not inadvertently mixed during recycling.

In an embodiment, the data associated with at least one of the container, its contents and the vehicle may be used by a controller and/or an operator to assist in collection of fluid containers for supply, recycling, use or disposal, allowing for example fluid containers of the same type or containing the same fluid or fluid having a given characteristic or characteristics or quality or qualities to be collected together for storage and/or transportation, resulting in a more efficient process and potentially reducing transportation time and costs.

Controlling carrying out of at least one action may occur either when container is determined not to be in fluidic communication with the fluid circulation system of the vehicle or when container is determined to be in fluidic communication with the fluid circulation system of the vehicle, dependent upon the circumstances and the stage in a lifecycle of the fluid container, which lifecycle may for example comprise at least one or more of an operational stage, a service stage, an analysing stage, a collection stage, a recycling stage and a supply stage.

Embodiments provide a method of recycling, which method comprises a controller: receiving a container which has been removed from a dock in a vehicle and which, at least before being seated in the dock, contained an ancillary fluid for supply to a fluid circulation system of the vehicle; communicating with a data carrier carried by the container; determining, on the basis of the communication with the data carrier, whether to recycle at least one of the container and any remaining contents of the container. Embodiments allow recycling or disposal to be carried out in a manner appropriate to the specific container and/or its contents or the vehicle with which it is associated so enabling, for example, different fluids or different qualities of the same fluid or the same fluid at different stages of degradation or aging to be subject to respective appropriate recycling processes where in some cases the selected process may be disposal and enabling, for example, different containers or similar containers of different ages or usage be subject to respective appropriate recycling processes where in some cases the selected process may be disposal. The data carried by the data carrier may allow the controller to identify at least one of the container and its contents.

The determining may comprise determining, on the basis of the communication with the data carrier, whether any remaining contents should be recycled, reused or disposed of. The determining may comprise alerting a user as to whether any remaining fluid in the container should be added to a recycle bin designated for receipt of specific fluid. The determining may comprise the controller determining, on the basis of the communication with the data carrier, whether the container should be recycled, refilled or disposed of. After the determining, a user may be alerted as to whether the container should be recycled, refilled or disposed of.

Embodiments provide a method comprising a controller: communicating with a data carrier carried by a container which, at least before being removably seated in a dock in a vehicle, contained an ancillary fluid for supply to a fluid circulation system of the vehicle; determining, on the basis of the communication with the data carrier, data relating to at least one of the current state and history of at least one of the container, its contents and the vehicle; and controlling at least an aspect of the vehicle servicing on the basis of the determining. The data carried by the data carrier may allow the controller to identify at least one of the container and its contents.

Embodiments may enable the servicing to be informed and perhaps modified dependent upon whether, for example, the fluid is more contaminated or less contaminated than would be expected, dependent upon characteristics of the container, for example its age or period of use.

The ancillary fluid may be selected from the group consisting of a lubricant, a hydraulic fluid, a pneumatic fluid, a washer fluid, a fuel additive.

Embodiments of the invention will now be described, by way of example only, with reference to the accompanying drawings, in which.

In the drawings, like reference numerals are used to indicate like elements.

Disclosed embodiments provide a method of controlling at least one operation in at least part of a lifecycle of a replaceable container which is arranged to be removably seated in a dock in a vehicle and which at least before seating in the dock contains an ancillary fluid for use by the vehicle, which method comprises a controller:

communicating with a data carrier carried by the container;

determining, on the basis of the communication with the data carrier, data associated with at least one of the container, its contents and the vehicle;

and controlling carrying out of at least one action in relation to at least one of the container and its contents on the basis of the data associated with at least one of the container, its contents and the vehicle.

The controlling carrying out of at least one action may occur either when container is determined not to be in fluidic communication with the fluid circulation system of the vehicle or when container is determined to be in fluidic communication with the fluid circulation system of the vehicle, dependent upon the circumstances and the stage in a lifecycle of the fluid container, which lifecycle may for example comprise at least one or more of an operational stage, a service stage, an analysing stage, a collection stage, a recycling stage and a supply stage.

An example of a vehicle which may receive such a replaceable container and an example of such a container will now be described with reference to FIGS. 1 and 2.

Figure 1:
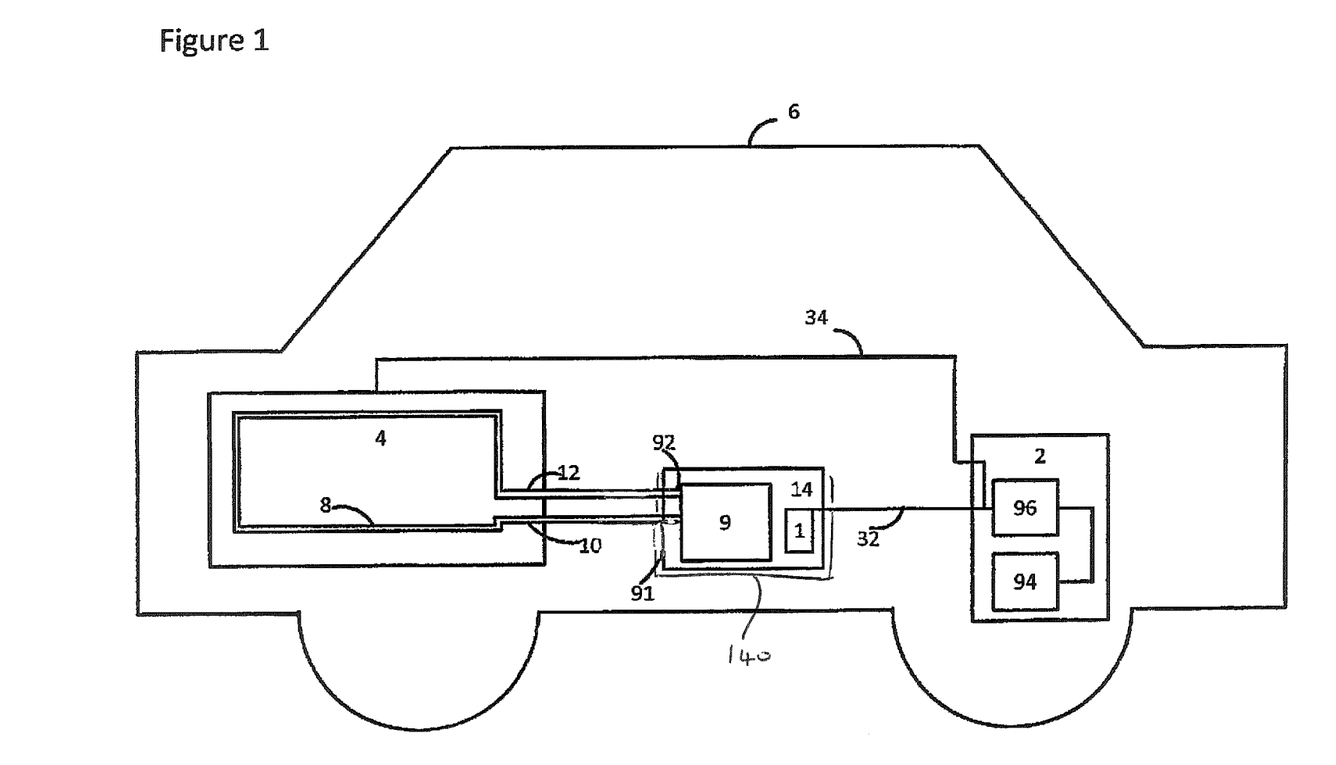
FIG. 1 shows a schematic illustration of a vehicle with a replaceable container seated in a dock.

As shown in FIG. 1, a vehicle 6 comprises an engine 4 and an engine control device 2. The vehicle has at least one fluid circulation system for circulating fluid for use within the vehicle from the removable fluid container 14. In the example shown the fluid circulation system is associated with the engine 4 and may be a lubricant system.

A replaceable fluid container 14 is removably seated in the vehicle by means of a dock 140 and is arranged to supply fluid to the fluid circulation system during operation of the vehicle. When initially seated in the vehicle, the replaceable fluid container 14 contains fluid.

The fluid circulation system 8 is coupled to receive fluid from a fluid outlet port 91 of a fluid reservoir 9 of the fluid container 14 via a supply line 10, and to return fluid that has circulated in the engine 4 to the fluid reservoir 9 via a fluid return line 12 and a fluid inlet port 92 of the fluid reservoir 9.

The fluid container 14 has a data provider 1 for providing data about the fluid container 14 and/or its contents. In this example, the data provider 1 is arranged to provide data to the engine control device 2 via a first communication link 32.

The ports 91, 92 of the fluid container 14 may comprise self-sealing couplings or any other suitable form of couplings. The dock and container together may provide a releasable fastening mechanism, for example a locking mechanism, to hold the container 14 seated in or at the dock.

The engine control device 2 comprises a processor 96, and a data store (memory) 94 configured to store control data for the engine 4 and possibly also other data for example for supply to a device external to the vehicle. The processor 96 is configured to monitor and to control the operation of the engine 4, via a second communication link 34. The engine control device 2 is further configured to obtain data from the data provider 1 via the communication link 32 and may control the engine at least partly on the basis of data obtained from the data provider 1.

In this example, communication between the processor 96 and data provider 1 is enabled once the fluid container 14 is seated in the dock. Communication between the processor 96 and data provider 1 may also be enabled as the fluid container 14 approaches the dock, for example when the data provider 1 comes into wireless communication range, if the communications link 32 is a wireless one. The dock may also have a data provider to enable communication of data to the processor 96 from the dock. The dock and the data provider or container may be able to communicate wirelessly and the dock may be able to communicate with the processor 96 via the communications link 32 to enable communication between the processor 96 and data provider 1 as the fluid container 14 approaches the dock. As will be described below, data from the data provider 1 may be communicated to another controller, for example directly from the data provider via wireless communication link or, if the fluid container 14 is seated in the dock 140 or is communications range of the dock or the processor 96, via the dock 140 and/or the processor 96.

Figure 2:
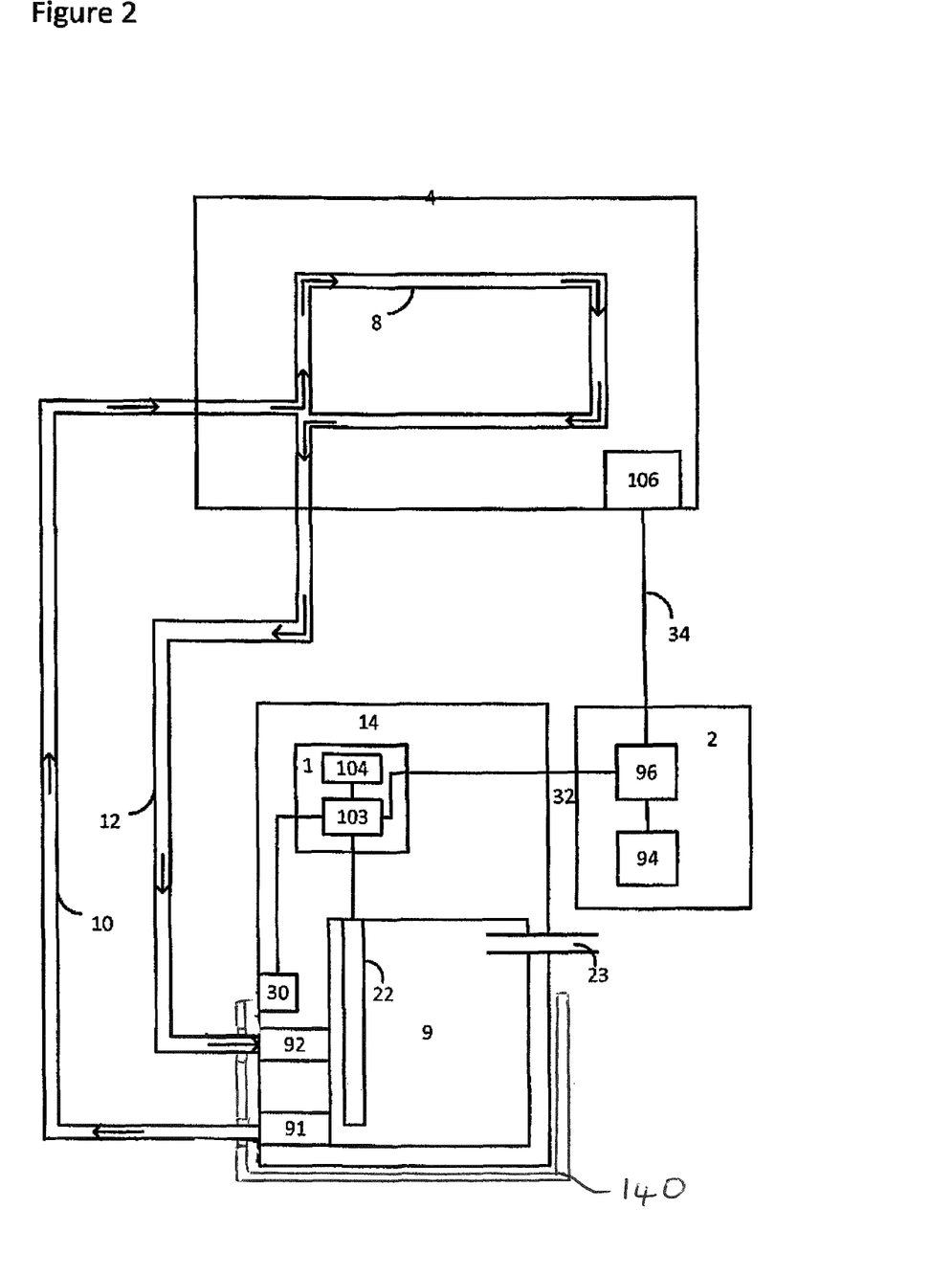
FIG. 2 shows a schematic block diagram of an engine fluid circulation system for the vehicle.

FIG. 2 shows a schematic block diagram of an engine fluid circulation system for the vehicle including an example of the replaceable container 14 with the associated fluid circulation system and the engine control device 2.

In the example shown in FIG. 2, in addition to the inlet and outlet ports, the reservoir 9 may have a vent 23 to enable pressure relief as fluid is drawn into and out from the reservoir 9. The fluid container 14 may have a connection sensor 30 for sensing when the fluid container 140 is docked and is in fluid communication with the fluid circulation system 8. The fluid container 14 may have a fluid sensor 22 to sense at least one characteristic of the fluid in the container.

The data provider 1 of the fluid container 14 may as shown in FIG. 2 comprise a processor 103 arranged to receive signals from the fluid sensor 22 and the connection sensor 30, and to communicate data to the engine control device 2 via the communication link 32. The data provider 1 comprises a data store (memory) 104 for storing data describing or identifying at least one of the container and the fluid. In particular, the memory 104 may store data including at least one of: the grade of fluid, the type of fluid, the date on which the fluid was filled or replaced, a unique identifier of the container 140, an indication of whether the container is new, or has previously been refilled or replaced, an indication of the vehicle mileage, the number of times the container has been refilled or reused, and the total mileage for which the container has been used.

The engine 4 shown in FIG. 2 may comprise an engine communication interface 106 arranged to communicate operational parameters of the engine, such as engine speed and throttle position, to the processor 96 of the engine control device 2 via the communication link 34. The engine communication interface 106 is further arranged to receive engine commands from the engine control device 2 and to modify operation of the engine 4 based on the received commands.

The memory 94 of the engine control device 2 comprises memory (which may be non-volatile or battery-backed-up) configured to store, for example:
identifiers of acceptable fluids for use in the engine 4;
data defining a first container fluid level threshold and a second fluid level threshold;
data indicative of an expected container oil level based on the mileage of the vehicle;
data defining a service interval, wherein the service interval is the time period between performing maintenance operations for the vehicle such as replacing the fluid;
the vehicle mileage;
sets of engine configuration data for configuring the engine to operate in a selected way;
an association (such as a look up table) associating fluid identifiers with the sets of engine configuration data; and,
data indicative of an expected oil quality based on the mileage of the vehicle.

The processor 96 is operable to compare data stored in the memory 94 with data obtained from the data provider 1 of the container 140 and from the communication interface 106 of the engine 4.

Further details of examples of data providers and examples of fluid containers may be found in International Application No. PCT/EP2013/074209, the whole contents of which are hereby incorporated by reference.

An example of a lifecycle of the fluid container 14 will now be described with aid of FIGS. 3 and 4.

Figure 3:
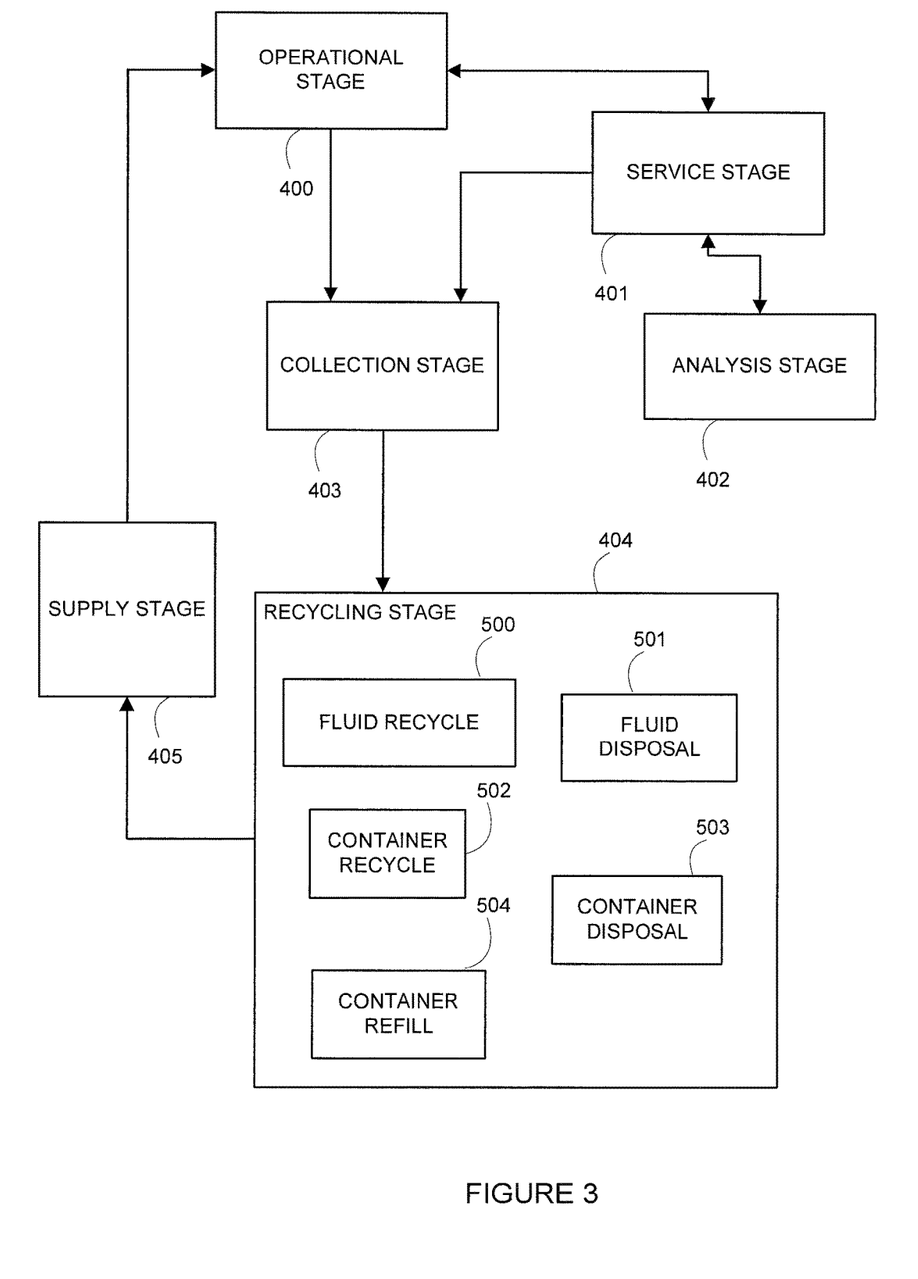
FIG. 3 shows a diagram of an example lifecycle of a replaceable container.
Figure 4:
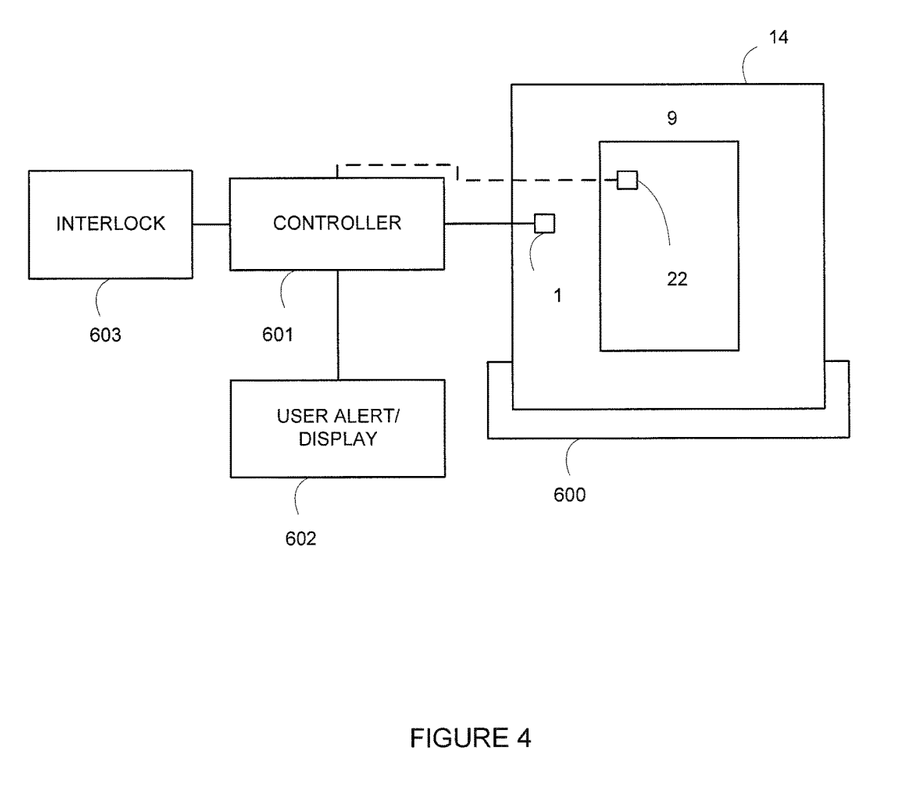
FIG. 4 shows a schematic illustration of a lifecycle stage.

As illustrated very diagrammatically in FIG. 3, the lifecycle may for example comprise at least one or more of: an operational stage 400 in which the replaceable container is in use in a vehicle; a service stage 401 in which the vehicle is being serviced, maintained or repaired at a servicing facility, such as a garage, and the replaceable container is seated in the dock in the vehicle; an analysing stage 402 in which the replaceable container may be removed from the vehicle and fluid in the container subject to one or more analysis procedures; a collection stage 403 in which a fluid container removed from a vehicle is collected directly from the vehicle user or owner or from a collection point or a servicing facility and transported, possibly with other fluid containers, to a recycling stage 404; and a supply stage 405 in which refilled recycled containers are supplied, for example to a point of sale such as a garage or shop or perhaps even back to the same vehicle user or owner, for use in a vehicle.

As shown in FIG. 3, the recycling stage 404 provides a number of processes through which a particular container may pass, depending upon data associated with at least one of the container, its contents and the vehicle and data carried by the data carrier. As shown these processes include a fluid recycle process 500, a fluid disposal process 501, a container recycle process 502, a container disposal process 503 and a container refill process 504.

Examples of the operational stage are described above with reference to FIGS. 1 and 2. Each of the other stages may be as shown in FIG. 4, that is each stage may comprise a reception station 600 which may be similar to the dock provided in the vehicle or may be a gateway or other entrance through which the container has to pass before that stage can commence, a controller 601 that is arranged to read data from the data carrier 1 of the fluid container 14 and perhaps also the sensor 22, a user alert (for example an audio or visual alert) and/or display 602 to provide information to an operator and an interlock system 603 that may permit, inhibit or prevent processing of the fluid container and/or its contents by that stage by mechanical or other means. For example, a mechanical interlock may control, inhibit or prevent access to the reception station by controlling the opening of an entrance or hatch of a gateway or entrance of the reception station or by controlling a docking prevention mechanism to control coupling to the reception station if the reception station is similar to the dock provided in the vehicle, so that access is denied in the event the data read from the data carrier indicates that one of the fluid or fluid container (or optionally the vehicle or vehicle make) is inappropriate for that stage. Such a mechanical interlock may have an electromagnetic actuator, for example by a solenoid, itself controlled by the controller. In other cases, the interlock may be a software or communications interlock that controls, inhibits or prevents operation of that stage. As another possibility, the interlock system could be omitted and reliance placed on user alert and/or display 602.

At each stage, the controller 601 is arranged to communicate with the data carrier carried by a container 14 located at its reception station 600, to determine, on the basis of the communication with the data carrier, data associated with at least one of the container, its contents and the vehicle and to control carrying out of at least one action in relation to at least one of the container and its contents on the basis of the data associated with at least one of the container, its contents and the vehicle.

As an example, at the collection stage 403, the controller may alert (for example by use of a visual and/or audible alarm and/or message on a display) a person wishing to deposit a fluid container for collection if the data associated with at least one of the container, its contents and the vehicle indicates that the container is not appropriate for collection, for example if the data indicates that the container contains fluid that should not be collected at that collection point or that that type of the container should not be collected at that collection point or the container is associated with a vehicle or make of vehicle that that collection point does not serve. In addition to such an alert or display, there may as discussed above be an interlock system that inhibits or prevents a container from being collected, for example by locking or preventing opening of a gateway, door or other or entrance to a store at the collection point or to a transportation device at the collection point. This enables the collection stage to control which fluid containers it will receive and may for example allow a collection stage to be dedicated to a particular fluid, particular type of fluid container, and/or a particular vehicle or make of vehicle, for example.

At the servicing stage, the controller may after reading data from the data provider provide, via the display or other output device, a service engineer with information relevant to the vehicle servicing to inform the servicing or may use that data directly to control which of a number of servicing procedures are carried out. The data may for example include any one or more of data defining a service interval, the vehicle mileage, engine configuration data for configuring the engine to operate in a selected way, an association (such as a look up table) associating fluid identifiers with the sets of engine configuration data, data indicative of an expected oil quality based on the mileage of the vehicle, data indicative of one or more characteristics or qualities of the fluid and/or how that one or more characteristic has changed with time.

At the analysis stage, the controller may alert the user by use of a visual and/or audible alarm and/or message on a display not to supply fluid from the container to an analysis chamber or control the interlock 603 to inhibit or prevent entry of the container into an analysis chamber if the data determined by reading the data carrier indicates that the fluid in the container is not suitable for analysis in that analysis chamber or is so degraded that the results of the analysis would not be useful, but otherwise permit entry of the container into an analysis chamber. The controller may also read data from the sensor 22 and use that data to control which of a number of analytical techniques are carried out on the fluid in the container. The controller may alert the user as to the type of analysis that should be carried out. If the data carrier is writable to, then the controller may write data indicative of the results of the analysis or analyses to the data carrier for use by controllers at other stages, such as the recycling stage.

At the recycling stage, the controller determines on the basis of data determined by reading the data carrier indicative of the quality and/or characteristics of the fluid whether the fluid is suitable for recycling or not and may for example control which path of a conveyor or other transport system the fluid container travels along or which doors or gateways are opened so that the fluid container is passed to the fluid recycle process 500 if the fluid quality and/or characteristics indicate that the fluid is suitable for recycling and is passed to the fluid disposal process 501 if the fluid quality and/or characteristics indicate that the fluid is not suitable for recycling. The controller may then select which of the container disposal process 503, container refill process and container recycle process to forward the the empty fluid container to, dependent upon data determined by reading the data carrier, for example if the data indicates that the container has not previously been recycled or has been recycled less than a given number of times the controller may add one to the recycle count in the data carrier and then cause the container to be passed to the container recycle process 502 and thereafter to the container refill process 504 whereas if the controller determines by reading the data carrier that the container has already been recycled a given number of times, the controller may cause the container to be passed to the container disposal process 503. A container may also be recycled without being refilled, if the data indicates that it should be supplied empty for use elsewhere.

Refilled recycled containers may be supplied to the supply stage 405. At this stage, the controller may issue an alert by use of a visual and/or audible alarm and/or message on a display if the data associated with at least one of the container, its contents and the vehicle indicates that the container is not appropriate for that supply stage, for example if the data indicates that the container contains fluid that should not be supplied from that supply stage or that that type of the container should not be supplied from that supply stage or the container is associated with a vehicle or make of vehicle that that supply stage does not serve. In addition to such an alert or display, there may as discussed above be an interlock system that inhibits or prevents a container from entering a particular supply stage, for example by locking or preventing opening of a gateway, door or other or entrance to a store at the supply stage or to a transportation device at the supply stage. This enables the supply stage to control which fluid containers it will receive and may for example allow a supply stage to be dedicated to a particular fluid, particular type of fluid container, and/or particular vehicle for example.

It will be appreciated that one or more of the stages shown in FIG. 3 might not form part of the lifecycle of a particular fluid container. For example, although the container may be present, it might not be involved in the servicing stage. The output of the analysis stage may be provided with the fluid container to one or more of the other stages, or may be associated with an identifier identifying that fluid container and supplied via a communication link to the controller of one or more other stages. As another possibility, the analysis stage may be omitted. The various stages may be geographically separated or at a single site in which case the collection and supply stages may simply be stores and not involve any transportation. As another possibility, two or more stages may be at the same site and others geographically separated from them.

Generally, the fluid container will be docked in the vehicle in the operational and service stages 400 and 401 and separate from the vehicle in the other stages. However, dependent upon the constraints on the analysing, collection and recycling stages, it may be possible for a controller 601 to read the data provider before the fluid container is removed from a vehicle, enabling a vehicle user or owner to drive to the lifecycle stage and only have to remove the fluid container from the vehicle if the controller advises the vehicle user or owner via the user alert/display 602 that that fluid container is acceptable at that particular analysing, collection or recycling stage. Also the fluid container could be removed from the vehicle in the service stage.

The fluid may be any type of fluid ancillary to the vehicle's fuel such as a lubricant, or coolant, or de-icer, washer fluid, or any other fluid associated with the engine. As many different types and grades of such fluid are available, the data provider may comprise an identifier of the fluid. The fluid need not necessarily be circulated back to the fluid container in operation of the vehicle but may be passed to another collection point (e.g. a wet sump for a lubricant) or may be consumed, for example as in the case of washer fluid.

The data provider 1 may comprise a data store or memory storing an identifier of the fluid, and a communication interface to enable data stored in the memory of the data provider 1 to be passed via an appropriate wired or wireless communication link or network (such as the Internet or a WAN or LAN) to the processor 96 of the engine control device or a controller in one of the lifecycle stages or another controller such as controller, for example a server, associated with the supplier of the fluid container and/or its contents and/or associated with the supplier of a vehicle or vehicle make associated with the fluid container manufacturer, with or without the container being seated in a dock or a dedicated reception station. Any one or more communication paths may be encrypted with communication paths to different controllers generally using different encryption schemes.

The data provider 1 may comprise a computer readable identifier for identifying the fluid and/or the container, the identifier may be an electronic identifier, such as a near field RF communicator, for example a passive or active RFID tag, or an NFC communicator.

The data provider 1 may be configured to be read only but, as in examples discussed above, may also be writable by an engine control device or any one of the controllers mentioned above via an appropriate wired or wireless communication link or network such as the Internet or a WAN or LAN.

The data provider 1 may provide simply an identifier identifying the actual data which may be accessible by the processor 96 or any one of the controllers mentioned above, from its own data store or from a remote data store accessible via a wired or wireless communication link or a network such as the Internet or a WAN or LAN. This enables accommodation for the possibility that the data associated with an identifier provided by a data provider may itself change with time even if the identifier does not, so enabling data regarding changes in any one or more of the container, fluid and or vehicle to be recorded in association with that identifier without the need for the data provider to be writable, for example data may be recorded by the engine control device and downloaded at service time to a computer data base accessible by the controllers of the lifecycle stages or may be provided directly from the engine control device and/or one or more of the controllers of the lifecycle stages to a central data base via a wireless and/or wired communication link or a network such as the Internet or a WAN or LAN.

The data associated with data carrier or data provider 1 may comprise any appropriate data pertinent to at least one of the fluid, the container and the vehicle. In examples, the data associated with data carrier or data provider 1 may comprise at least one property of the fluid selected from the group consisting of: the amount of fluid, the temperature of fluid, the pressure of fluid, the viscosity of fluid, the viscosity index of the fluid, the density of fluid, the electrical resistance of fluid, the dielectric constant of fluid, the opacity of fluid, the chemical composition of fluid, the origin of the fluid and combinations of two or more thereof.

The data carrier or data provider 1 need not necessarily have a memory but may simply provide an identifier that enables access to associated data stored elsewhere. The identifier may be an optical identifier, such as a barcode, for example a two-dimensional barcode, or a colour coded marker, or optical identifier on the container or even the colour, shape and/or configuration of the container. Regardless of how it is provided, the identifier may be encrypted and any data communication may be encrypted.

The lifecycle stages other than the operational stages may share a controller or the functions of each controller may be distributed to two or more control devices. The controllers may be a processor or processors or other computer device with, where appropriate, a mechanical and/or electrical interface, to allow control of gateways or entrances, analysis devices and/or pathways of conveying systems.

Any described communication link may be a wired or wireless communication link or a combination thereof and could comprise an optical link. Where appropriate a communication link may be via a network such as the Internet or a WAN or LAN The fluid container has been described as comprising particular types of sensors. However, one or both of these sensors may be omitted, e.g. as in FIG. 1 above. Where sensors are used any type of sensor, or combination of sensors can be used. For example, to sense the level of fluid in the container: a mechanical float, a position sensor, an electrical coil, capacitive sensors, resistivity sensors, ultrasonic level detection, visible or infra-red light detection, pressure sensing, or other sensors. The sensing system may provide information about the level in a continuous range between two fixed points or as discrete levels (e.g. full, half full, empty). Additionally, if the level of the liquid increased rapidly it could indicate some form of failure in the engine and provide an early warning mechanism to help prevent further damage to the engine. A fluid container may comprise sensors configured to sense at least one of a temperature, pressure, viscosity, density, electrical resistance, dielectric constant, opacity, chemical composition or amount of the container oil which data may be read and used by any of the processor or controllers described above. It will further be appreciated that a plurality of fluid sensors could be provided, each to sense a different property of the fluid. The analysis stage if present may make use of any of these sensors and/or may have its own sensor or sensors that sense a characteristic or characteristics of fluid samples extracted from the fluid container at the analysis stage.

Information about the fluid, e.g. oil, quality may be obtained through simple capacitance or resistivity measurements. These might, for example, indicate the presence of water in the oil or of metallic or carbonaceous particulates suspended in the oil. Optical measurement techniques may be used to assess, for example, clarity and/or colour of the fluid.

In the context of the present disclosure, those skilled in the art will appreciate that the fluid ports of the fluid container could comprise any suitable coupling for retaining the fluid container in fluid communication with the fluid circulation system. The port couplings could be arranged to be remotely decoupled from the fluid lines to place the fluid container in its uncoupled configuration. It will further be appreciated that the fluid container could comprise an actuator to decouple the fluid container from the circulation system or from any reception station.

Although fluid is described as being returned to the fluid container for recirculation, in the context of the present disclosure, those skilled in the art will appreciate that circulated fluid could be collected and stored in a container coupled to the engine and, when convenient, emptied from or otherwise removed from the vehicle.

As set out above, the data provider may be configured to provide information relating to the fluid in the container, for example, where the fluid is oil, the oil grade and/or type. The data provider may also provide data indicating the date on which the container was refilled, a unique serial number of the container, the length of time (e.g. number of hours) for which the container has been used, and whether the container holds new or refilled fluid.

As described above the data provider may be a read only or writable memory. The fluid container may however also carry a controller that may be part of or additional to the data provider. Such a controller may communicate (for example via a wired or wireless communication link and or via a network such as the Internet, a WAN or a LAN) with a vehicle control device or any of the other controllers mentioned above. Such a controller may enable, for example, on-container processing of data from a container sensor and/or data received from one or more of the controllers with which the fluid container controller may communicate and subsequent updating or modifying of any data stored by the data provider and/or communication with one or more other controllers of the results of that processing.

The dock may simply be the coupling to the fluid supply lines or a coupling plate or mount or may be a dedicated dock receptacle designed to receive at least a portion of the fluid container.

The function of the processors and controllers described above may be provided by any appropriate controller or control device, for example by analogue and/or digital logic, field programmable gate arrays, FPGA, application specific integrated circuits, ASIC, a digital signal processor, DSP, or by software loaded into a programmable general purpose processor. Aspects of the disclosure provide computer program products, and tangible and/or non-transitory media storing instructions to program a processor to perform any one or more of the methods described herein.

It may be possible to apply the present invention to fluid containers for use with engines other than in vehicles or for reverse engines or generators and turbines such as wind turbines.

Other variations and modifications will be apparent to persons of skill in the art in the context of the present disclosure.

The invention claimed is:

1. A method of controlling at least one operation in at least part of a lifecycle of a replaceable container which is arranged to be removably seated in a dock in a vehicle and which at least before seating in the dock contains an ancillary fluid for use by the vehicle, which method comprises a controller:
   communicating with a data provider carried by the container;
   determining, on the basis of the communication with the data provider, data associated with at least one of the container, its contents and the vehicle; and
   controlling carrying out of at least one action in relation to the contents of the container on the basis of the data associated with at least one of the container, its contents and the vehicle, wherein the at least one action is selected from the group consisting of: disposing of the contents of the container; recycling of the contents of the container; adding the contents of the container to a recycling container arranged to store contents from a plurality of replaceable containers; replenishing the contents of the container; adding an additive to the contents of the container; and reusing the contents of the container.

2. A method according to claim 1, further comprising determining whether the container is in fluidic communication with a fluid circulation system of the vehicle; and controlling carrying out of at least one action in relation to the contents of the container in dependence upon whether the container is in fluidic communication with the fluid circulation system of the vehicle.

3. A method according to claim 2, wherein the controlling of carrying out of at least one action in relation to the contents of the container is carried out when the container is not in fluidic communication with the fluid circulation system of the vehicle.

4. A method according to claim 1, wherein the ancillary fluid is selected from the group consisting of: a lubricant, a hydraulic fluid, a pneumatic fluid, a washer fluid, and a fuel additive.

5. A method according to claim 1, further comprising analysing the contents of the container and controlling carrying out of the at least one action on the basis of the data associated with at least one of the container, its contents and the vehicle and on the basis of data obtained by analysing the contents of the container.

6. A method according to claim 1, wherein controlling carrying out of at least one action comprises permitting, inhibiting or preventing the at least one action.

7. A method according to claim 1 wherein the data carried by the data provider allows the controller to identify at least one of the container.

8. A method according to claim 2, wherein the controlling of carrying out of at least one action in relation to the contents of the container is carried out when the container is in fluidic communication with the fluid circulation system of the vehicle.

9. A method of recycling, which method comprises:
   receiving a container which has been removed from a dock in a vehicle and which, at least before being seated in the dock, contained an ancillary fluid for supply to a fluid circulation system of the vehicle;
   a controller communicating with a data provider carried by the container; and
   the controller determining, on the basis of the communication with the data provider, whether any remaining contents of the container should be recycled, reused or disposed of.

10. A method according to claim 9, further comprising, after the determining, the controller alerting a user as to whether any remaining contents of the container should be added to a recycle bin designated for receipt of specific content.

11. A method of controlling at least one operation in at least part of a lifecycle of a replaceable container which is arranged to be removably seated in a first dock in a vehicle and which at least before seating in the first dock contains an ancillary fluid for use by the vehicle, which method comprises a controller:
communicating with a data provider carried by the container;
determining, on the basis of the communication with the data provider, data associated with at least one of the container, its contents and the vehicle; and
controlling carrying out of at least one action in relation to the container on the basis of the data associated with at least one of the container, its contents and the vehicle, wherein the at least one action is selected from the group comprising: inserting the container into a second dock; removing the container from the second dock; entry of the container into a facility; removing the container from a facility; disposing of the container; recycling of the container; and supplying of the container.

12. A method according to claim 11, further comprising determining whether the container is in fluidic communication with a fluid circulation system of the vehicle; and controlling carrying out of at least one action in relation to the container in dependence upon whether the container is in fluidic communication with the fluid circulation system of the vehicle.

13. A method according to claim 12, wherein the controlling of carrying out of at least one action in relation to the container is carried out when the container is not in fluidic communication with the fluid circulation system of the vehicle.

14. A method according to claim 11, wherein the ancillary fluid is selected from the group consisting of: a lubricant, a hydraulic fluid, a pneumatic fluid, a washer fluid, and a fuel additive.

15. A method according to claim 11, further comprising analysing the contents of the container and controlling carrying out of the at least one action on the basis of the data associated with at least one of the container, its contents and the vehicle and on the basis of data obtained by analysing the contents of the container.

16. A method according to claim 11, wherein controlling carrying out of at least one action comprises permitting, inhibiting or preventing the at least one action.

17. A method according to claim 11 wherein the data carried by the data provider allows the controller to identify at least one of the container and its contents.

18. A method according to claim 12, wherein the controlling of carrying out of at least one action in relation to the container is carried out when the container is in fluidic communication with the fluid circulation system of the vehicle.

19. A method according to claim 11, wherein the second dock is selected from the group comprising: the first dock; a dock in a transportation device; a dock in a vehicle service centre; a dock in an analysing facility; and a dock in a recycling facility.

20. A method according to claim 11, wherein the at least one action comprises at least one action in relation to vehicle servicing.

21. A method of recycling, which method comprises:
receiving a container which has been removed from a dock in a vehicle and which, at least before being seated in the dock, contained an ancillary fluid for supply to a fluid circulation system of the vehicle;
a controller communicating with a data provider carried by the container; and
the controller determining, on the basis of the communication with the data provider, whether the container should be recycled, reused or disposed of.

22. A method according to claim 21, further comprising, after the determining, the controller alerting a user as to whether the container should be recycled, refilled or disposed of.

* * * * *